United States Patent [19]

Riedl

[11] 4,125,033
[45] Nov. 14, 1978

[54] REGULABLE APPLIANCE FOR INFINITELY ADJUSTABLE VARIATOR, ESPECIALLY FOR VEHICLES

[76] Inventor: Franz Riedl, Amselweg, 8941 Boos, Fed. Rep. of Germany

[21] Appl. No.: 705,106

[22] Filed: Jul. 14, 1976

Related U.S. Application Data

[63] Continuation of Ser. No. 579,588, May 21, 1975, abandoned.

[30] Foreign Application Priority Data

May 21, 1974 [DE] Fed. Rep. of Germany ....... 2424577

[51] Int. Cl.$^2$ .................. F16D 29/00; F16H 29/04
[52] U.S. Cl. .................................. 74/125.5; 74/117; 74/56
[58] Field of Search .............. 74/117, 124, 125.5, 74/56 R

[56] References Cited

U.S. PATENT DOCUMENTS

| | | | |
|---|---|---|---|
| 2,126,294 | 9/1938 | Timmermann | 74/117 X |
| 2,174,698 | 10/1939 | Jacobs | 74/117 |
| 2,973,653 | 3/1961 | Riedl | 74/117 |
| 3,171,289 | 3/1965 | Riedl | 74/117 |
| 3,229,549 | 1/1966 | Riedl | 74/117 X |
| 3,448,627 | 6/1969 | Brooks | 74/125.5 X |

Primary Examiner—Samuel Scott
Assistant Examiner—Lance W. Chandler
Attorney, Agent, or Firm—Craig & Antonelli

[57] ABSTRACT

An infinitely adjustable variator which includes a drive shaft having mounted thereon first and second plane disks with the first plane disk being operatively connected with an idling coupling or regulable appliance for controlling the movement thereof. The second of the plane disks serves as a counterweight for the first plane disk. A third plane disk is provided for adjusting the position of the first and second plane disks. A pair of slots spaced from each other by 180° are provided in the third plane disk for receiving cams provided on the first and second plane disks. An eccentric bore is provided in the first and second plane disks for receiving disk members fixedly mounted to the drive shaft. The third plane disk is connected to a box-shaped body which in turn is connected to a shiftable sleeve concentrically mounted with respect to the drive shaft. Actuating devices are operatively connected with the sleeve for selectively shifting the same.

10 Claims, 5 Drawing Figures

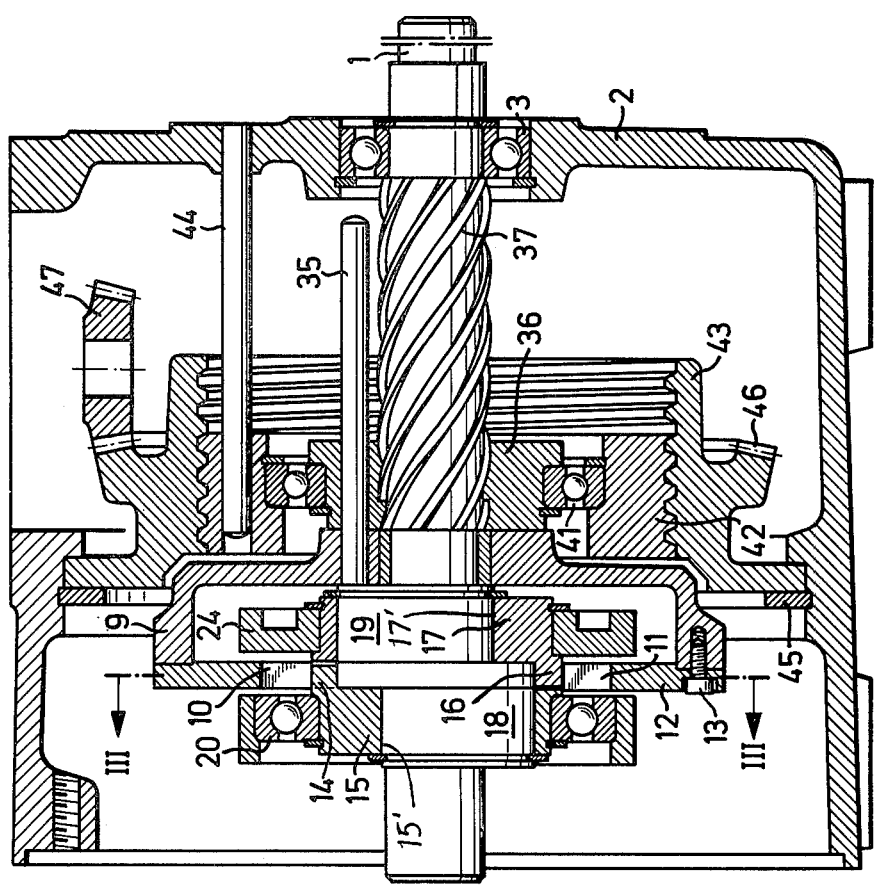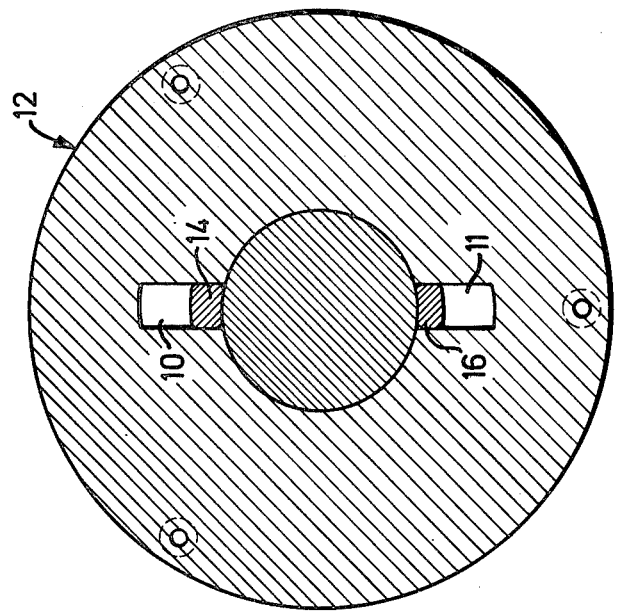

– 4,125,033 –

REGULABLE APPLIANCE FOR INFINITELY ADJUSTABLE VARIATOR, ESPECIALLY FOR VEHICLES

This application is a continuation of Ser. No. 579,588, filed May 21, 1975, now abandoned.

The invention relates to a switch gear for infinitely adjustable variators, especially for vehicles. The variator includes two plane disks mounted on and rotating with a drive shaft. The plane disks are movable against each other in opposite directions with the first plane disk controlling the movable parts of an idling coupling and switch gear, respectively, and the second plane disk serving as counterweight for the first plane disk. The variator is adjusted by a third plane disk concentrically mounted on the drive shaft which works in connection with the two plane disks. The speed of the third plane disk is variable with regard to that of the drive shaft and means are provided for enabling speed variation of the third plane disk in such a way that the speed becomes equal to, lower or higher than the speed of the driven shaft. To alter the speed of the third plane disk a rotating and shiftable sleeve is provided on the drive shaft which sleeve is connected to the third plane disk by rods.

Regulable appliances of similar kind are already known as, for example, in U.S. Pat. Nos. 3,171,289, 3,229,549 and 3,306,117, and German Pat. No. 1,209,003. In regulable appliances of the German Patent and the last-mentioned United States Patent, three toothed wheels are mounted on the dive shaft, one toothed wheel is securely fixed to a threaded plane disk, the boss of which serves as a bearing for the two other toothed wheels, with each of the three toothed wheels being securely fixed to a further toothed disk and a toothed ring, respectively, and with each wheel being separately engageable with a toothed shift controlled socket rotating with the drive shaft. One of the two disks in working connection with the threaded plane disk enables to and fro movement of the idling coupling parts, if it is radially shifted against the rotating axis of the drive shaft, the second disk in working connection with the threaded plane disk serves as counterweight for the first disk.

Regulable appliances of this kind have, however, the disadvantage that their fabrication is complicated and expensive and that the speed alteration can only be performed within a certain time limit.

The present invention is concerned with providing a variator wherein a plane disk is provided for the radial movement of the two other plane disks which are shiftable against each other in opposite direction which variator not only allows for reaching considerable speed differences within a comparably short time but also is designed in such a manner that its fabrication costs as well as those of the two connected plane disks can be reduced considerably.

For solving this problem, according to the present invention, it is proposed that each of the two first plane disks have an eccentric bore with the drive shaft supporting two securely fixed rotating disks turned by 180° against each other with one of the plane disks being mounted on each rotating disk. The plane disks are each provided with a cam which fits into the respective notch of the third plane disk in which case the centerlines of both notches and the rotating axis of the drive shaft are balanced. It is obtained by this construction that the third plane disk has only to be made half a turn against the drive shaft for increasing the speed of the drive shaft of the infinitely adjustable variator from zero to maximum speed or to lower it from maximum speed to zero, respectively. The fabrication of the plane disk and the arrangement of cams can be performed with simple machines within a comparatively short time contrary to the fabrication of threaded plane disks utilized in the prior art.

The installation in accordance with the present invention is very simple and minimizes the difficulties encountered with conventional threaded plane disk structures.

The features and advantages of the present invention will become more clearly apparent from the following detailed description thereof which is to be read with reference to the accompanying drawings, in which:

FIG. 2 is a longitudinal partial sectional view of a second embodiment of a regulable appliance in accordance with the present invention;

FIG. 3 is a sectional view taken along line A–B of FIG. 2;

Figure 1:
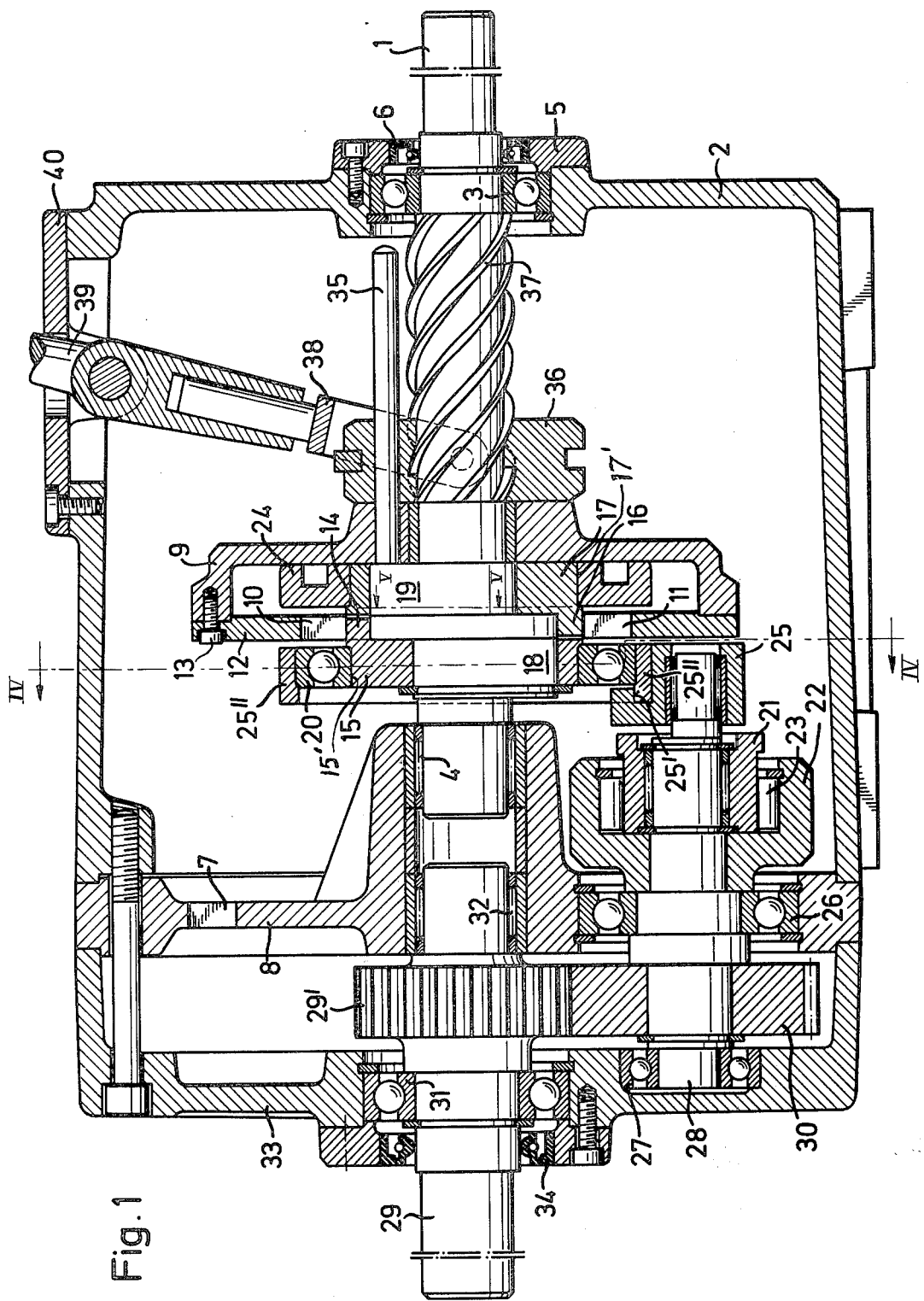
FIG. 1 is a longitudinal sectional view of a first embodiment of an infinitely adjustable variator in accordance with the present invention.

Referring now to the drawings wherein like reference numerals are used throughout the various views to designate like parts and, more particularly to FIG. 1, a drive shaft 1 of the infinitely adjustable variator is supported by ball bearings 3 and 4 in housing 2. Ball bearing 3 is located in the bottom of a bowl-shaped casing or housing 2 and is sealed to the outside by a sealing ring 6 situated in a disk cover 5. Ball bearing 4 is located in an intermediate wall 8 in the casing 2 with the wall 8 being provided with several gaps 7.

A freely rotating box-shaped body 9 is mounted on the drive shaft 1 and is closed by plane disk 12 provided with two slots 10 and 11.

Plane disk 12 is tightly fastened to the box-shaped body by screws 13. As shown most clearly in FIG. 3, cam 14 is provided on the plane disk 15 and fits into slot 10 and a cam 16 provided on plane disk 17 fits into slot 11. The plane disks 15, 17 are movable in opposite directions with respect to each other when the speed of rotation of the plane disk 12 is changed relative to the speed of rotation of the drive shaft 1.

Figure 5:
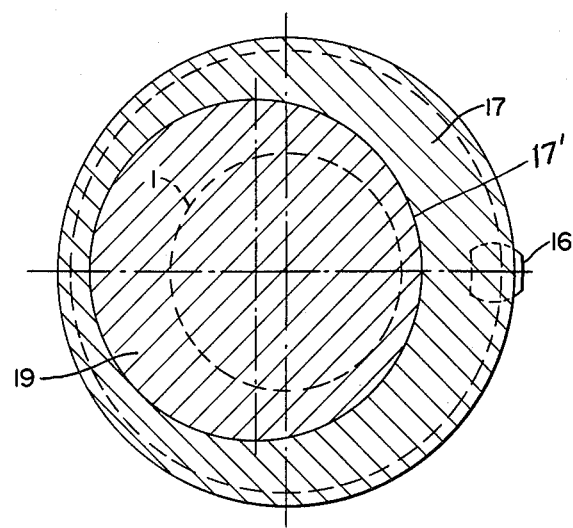
FIG. 5 is a cross-sectional view taken along the line V—V of FIG. 1.

As shown in FIGS. 1 and 5, the two plane disks 15 and 17 are provided with eccentric bores 15', 17' each of which encloses one of the two rotating disks 18 and 19 eccentrically turned by 180° against each other, which disks 18, 19 rotate at the same speed as the drive shaft 1. The disks 18, 19 are rigidly connected to the drive shaft 1.

The plane disk 15 acts by means of ball bearings 20 upon several oscillating arms 21 of idling couplings freewheel mechanisms or the like which include, outer parts designated by the reference numeral 22 and their grip or clamping rollers 23. The plane disk 17 including ring 24 is designed as a counterweight for counterbalancing any eccentricity of the plane disk 15 relative to the drive shaft 1. When the arms 21 are moved to and fro by segments 25, they take along the outer parts 22, in a known manner, so that the shafts 28 supported by bearings 26 and 27 of the outer idling couplings, of which only one coupling is shown in FIG. 1 for the sake of clarity, are rotating in the same direction.

Figure 4:
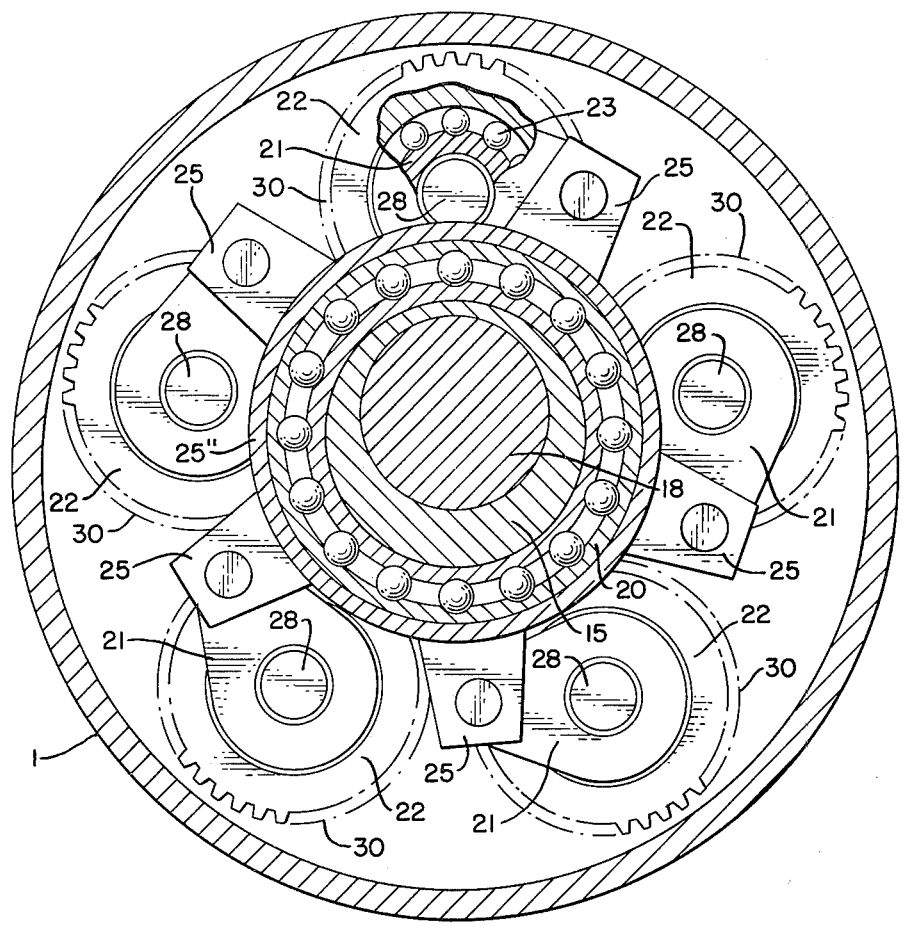
FIG. 4 is a partial cross-sectional view taken along the line IV—IV of FIG. 1.

As shown most clearly in FIGS. 1 and 4, five idling couplings may be distributed about the circumference of the variator in a manner more fully described in U.S. Pat. No. 3,229,549. Each of the shafts 28 bears a toothed wheel 30 which engages a toothed wheel 29' fixed to drive shaft 29. Drive shaft 29 is supported in cover 33 and intermediate wall 8 by bearings 31 and 32 with the inner space of the cover 33 being sealed by a sealing ring 34.

The box-shaped body 9 is connected by rods 35 to a sleeve 36 displaceably mounted on a steep or coarse threading 37 of the drive shaft 1. The sleeve 36 executes a rotational movement of 180° relative to the drive shaft 1 when shifted over the thread length. A fork 38 engages into sleeve 36 and is connected to a rotating lever 39, located in a cover 40 screwed on casing 2.

As shown in FIG. 2, the sleeve 36 can also be connected to a threaded ring 42 via ball bearing 41. The threaded ring 42 is mounted so as to be axially shiftable or movable. The movable ring 42, for instance, is located in body 43 which is provided with the same thread as the ring 42. The ring 42 is secured against rotation by a rod 44 fixed in casing 2. The body 43 is rotatably mounted in casing 2, and is secured against axial movement by a Seeger ring or circlip lock ring 45. The body 43 is, for instance, provided with toothing 46 which engages a pinion 47. A rotation of the pinion 47 results in a rotational movement of the body 43. Since the body 43 is secured against axial movement, the rotation of the body 43 results in the ring 42 being axially displaced by virtue of the threaded connection between the ring 42 and the body 43. The axial movement of the ring 42 is is transferred by way of the bearing 41 to the sleeve 36 so as to cause a shifting of the same.

If sleeve 36 is moved into the direction of ball bearing 3 with aforementioned or corresponding other means, the plane disk 12 and plane disks 15 and 17 will be turned between 0° and 180° relative to the drive shaft 1 and this may occur, for example, in any desired time intervals in the manner more fully described hereinabove in connection with the variator of FIG. 1.

Thus, if an infinitely adjustable variator equipped with a regulable appliance is installed into a motor vehicle according to the present invention, in which case another idler or freewheel mechanism should be provided between the drive and driven shaft, it will be possible, for instance, to reduce the maximum speed of the drive shaft 29 to zero at once, by shifting sleeve 36, corresponding to the disengagement of the main coupling of common motor vehicles.

On the other hand, i. e., a speed increment from zero to maximum speed is not of great importance for motor vehicles, but only if it is necessary that as quick an acceleration as possible is obtained and provided that the motor is capable of attaining the required acceleration without being throttled off.

Performed tests have proven that the simple and sturdy switch gear cannot only be used advantageously where it is necessary to reduce the maximum speed rapidly, as is for instance very essential for bobbin winders, but it can also be used with great advantage in cases where a quick speed alteration is required.

I claim:

1. An infinitely adjustable variator arrangement which includes a housing, a drive shaft means rotatably mounted in the housing, first and second plane disks mounted on said drive shaft and rotatable therewith, the first of the plane disks being operatively connected with idling coupling means for controlling the movement thereof, the second of the plane disks serving as a counterweight for the first plane disk, a third plane disk for adjusting the position of the first and second plane disks, means for concentrically mounting the third plane disk on the drive shaft, means for revolving the third plane disk on the drive shaft so that the revolving movement with respect to the drive shaft is at least one of equal to, lower and higher than the rotating speed of the drive shaft, a sleeve means mounted for shifting movement on the drive shaft, the improvement comprising: a pair of slots provided in the third plane disk, cam means provided on each of the first and second plane disks engageable in a respective one of said pair of slots, an eccentric bore provided in each of the first and second plane disks, and a pair of disk means fixedly mounted to the drive shaft and disposed in a respective eccentric bore of the first and second plane disks.

2. An arrangement according to claim 1, wherein the slots are spaced from each other by 180° on the third plane disk.

3. An arrangement according to claim 2, wherein the pair of disk means are eccentrically mounted on the drive shaft 180° out of phase.

4. An arrangement according to claim 3, wherein rod means are provided for connecting the third plane disk to the sleeve means.

5. An arrangement according to claim 4, wherein the means for concentrically mounting the third plane disk on the drive shaft includes a box-shaped body freely rotatably mounted on the drive shaft.

6. An arrangement according to claim 5, wherein means are provided for shifting the sleeve means relative to the drive shaft.

7. An arrangement according to claim 6, wherein said means for shifting includes a fourth member engageable with said sleeve means, and a lever means for selectively actuating said fourth member.

8. An arrangement according to claim 6, wherein said means for shifting includes a body member rotatingly mounted in the housing concentrically to the drive shaft, and a ring member movably mounted in said body member and operatively connected to the sleeve means.

9. An arrangement according to claim 8, wherein means are provided for securing said ring member against rotation relative to said housing.

10. An arrangement according to claim 9, wherein said means for securing said ring member is a rod secured to said ring member and said housing.

* * * * *